Sept. 20, 1927.
J. W. PROCTOR
1,642,788
PROCESS FOR MAKING AMMONIUM FLUORIDES
Filed Jan. 5, 1923
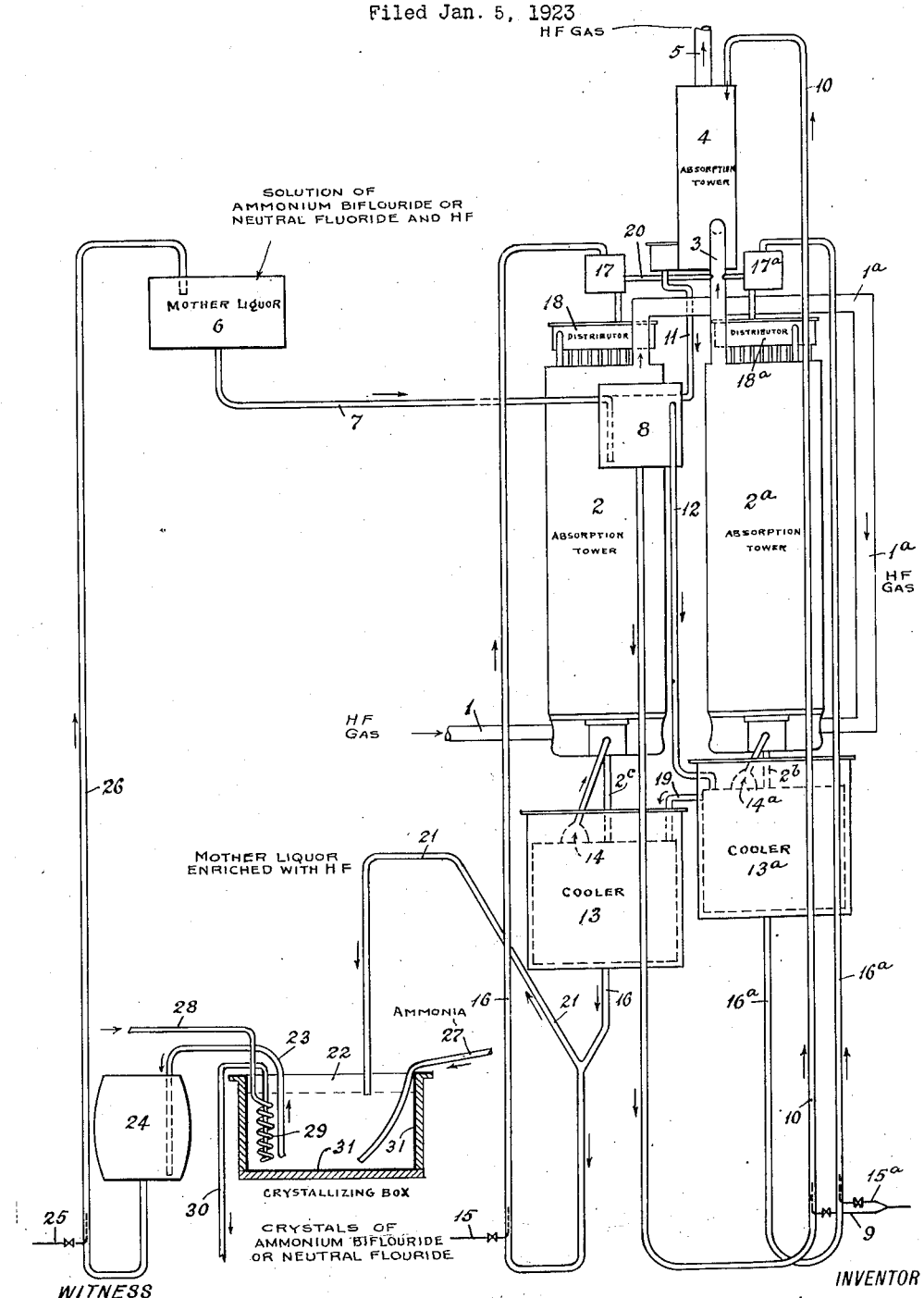
WITNESS
G. V. Rasmussen
INVENTOR
JAMES W. PROCTOR
BY
ATTORNEYS Patented Sept. 20, 1927.

1,642,788

UNITED STATES PATENT OFFICE.

JAMES WILLIAM PROCTOR, OF BELLE VERNON, PENNSYLVANIA, ASSIGNOR TO GENERAL CHEMICAL COMPANY, OF NEW YORK, N. Y., A CORPORATION OF NEW YORK.

PROCESS FOR MAKING AMMONIUM FLUORIDES.

Application filed January 5, 1923. Serial No. 610,818.

This invention relates to the making of ammonium fluorides, either the so-called normal or neutral ammonium fluoride generally represented by the chemical formula $NH_4F$, or the acid fluoride (also called ammonium bi-fluoride) the formula of which is usualy given as $NH_4F.HF$.

The object of my invention is to provide an efficient and readily controlled process which by a simple adjustment will yield either the neutral or the acid fluoride as the product of the operation.

A leading feature of my invention consists in using the mother liquor from a batch of final product as a vehicle for absorbing fresh quantities of hydrofluoric gas or vapor, and treating the result of such absorption with gaseous ammonia to make a further amount of the product. Crystallization is thereupon used to separate the resulting neutral or acid ammonium fluoride (one or the other being obtained by properly adjusting the amount of gaseous ammonia in relation to the hydrofluoric content of the mother liquor), from the mother liquor which is then used again as an absorbing vehicle for another quantity of hydrofluoric acid.

The process is preferably carried out in apparatus of the type illustrated diagrammatically in the accompanying drawing. The novel features of the invention will be pointed out in the appended claims.

At 1 I have indicated a pipe for admitting hydrofluoric acid gas to the lower part of an absorption tower 2 of any well-known or approved construction. The unabsorbed portion of such gas passes out at the top and, by means of a pipe $1^a$, reaches the bottom of a second absorption tower $2^a$, from the top of which the gas portion not absorbed in this second tower passes through a flue 3 to a third absorption tower 4, in which it travels upward and any gas remaining at the end of this third absorption passes out through the exit flue 5 to the waste gas stack where it escapes to the atmosphere. The mother liquor is stored in a tank 6, the outlet of which is connected by a pipe 7 with another tank 8. From the latter the liquor is transferred, by the use of a suitable propelling device, such as an air-lift 9, through a pipe 10 to the top of tower 4. The liquor collecting at the bottom of this tower flows through a pipe 11 back to the tank 8, so that a circulation takes place through the closed path 8, 10, 4, 11, 8. An amount of liquor corresponding to that entering the tank 8 through the pipe 7, passes out through an overflow 12 to a cooler $13^a$ provided with a gas vent $14^a$ leading to the lower portion of the absorption tower $2^a$. A portion of the liquor in cooler $13^a$ is withdrawn through a pipe $16^a$ and is conveyed by the action of a pump or other suitable propelling device, such as the air-lift $15^a$, to the upper portion of a splash box $17^a$ from which it passes down through a distributor $18^a$ to the top of the absorption tower $2^a$. Thus a second portion of liquor circulates through the closed path $13^a$, $16^a$, $17^a$, $18^a$, $2^a$, $13^a$, it being understood that there is a pipe $2^b$ connecting the lower portion of tower $2^a$ with the upper portion of cooler $13^a$. Similarly, a pipe $2^c$ enables the liquor at the lower portion of tower 2 to flow into a cooler 13 which also, through a pipe 19, receives the overflow from cooler $13^a$. An air-lift 15 or equivalent device takes a portion of the liquor from the cooler 13, through a pipe 16, to a splash box 17, from which such liquor passes to a distributor 18 and then to the top of absorption tower 2. Thus a third portion of liquor is circulated through the closed path 13, 16, 17, 18, 2, 13.

The two splash-boxes 17, $17^a$ are connected by an air-vent 20 communicating with the gas flue 3.

From the pipe 16 a branch or overflow 21 leads to a crystallizing and neutralizing tank 22, connected by a siphon 23 with another tank 24, from which, by means of an air-lift 25 or other suitable device, the mother liquor is conveyed through a pipe 26 to the storage tank 6.

The neutralizing and crystallizing tank 22 receives gaseous ammonia (from a usual storage container or cylinder, not shown) through a lead pipe 27 which extends nearly to the bottom of the liquor in said tank. Cooling water is admitted at 28 to the coil 29 and passes out at 30. The tank 22 is preferably made of wood with a lead lining 31.

The coolers 13, $13^a$ are provided with water-cooled jackets or with any other suitable cooling arrangement (not shown in detail).

In making ammonium bifluoride according to my process, with the aid of the apparatus shown, the procedure may be as follows:

First, I produce an initial body of mother liquor with which to start the process. For this purpose, the proper amount of hydrofluoric acid solution of a high strength (56% HF is suitable) and at atmospheric temperature, is run into a lead-lined tank of suitable capacity (the tank 22 may be used), and ammonia, preferably in the anhydrous or gaseous state, is passed into such acid (say, through the lead pipe 27) until a sufficient amount of ammonia has been absorbed to form a solution which upon subsequent cooling to atmospheric temperature will deposit crystals of ammonium bifluoride. The heat evolved by the reaction between the ammonia and hydrofluoric acid raises the temperature of the solution, which is then cooled to atmospheric temperature (as by water passed through the coil 29) whereby crystals of ammonium bifluoride are caused to be deposited. Crystallization should be as complete as possible in order to avoid subsequent crystallization of the mother liquor in other parts of the apparatus and consequent clogging of the circulation path. A centrifugal machine or other suitable means is employed to separate the mother liquor from the crystals, and such mother liquor is filled either directly into the storage tank 6, or into the tank 24 from which it is transferred to said storage tank by the air-lift 25, or other suitable device. The mother liquor prepared as described above will contain about 45% of ammonium bifluoride and a certain amount of uncombined hydrofluoric acid. The main operation may then be started.

Hydrofluoric acid gas (obtained by the action of sulfuric acid on calcium fluoride in an ordinary hydrofluoric acid still or in any other suitable way) is introduced at 1 into the tower 2 and travels upward therein, meeting the stream of liquid discharged downwardly from the distributor 18. The gas then passes through the pipe 1$^a$ to the second tower 2$^a$, and passes upwardly therein, meeting the downward stream of liquid from the distributor 18$^a$. Finally the gas passes through the flue 3 to the tower 4 and upwardly through the latter to the exit flue 5, meeting the stream of liquid which is discharged downwardly through the said tower 4 from the pipe 10. As explained above, the liquid passing through the tower 4 circulates through the closed path 10, 4, 11, 8, 10, this liquid being a portion of the mother liquor which has reached the tank 8 from the storage tank 6. An amount of mother liquor substantially equal to the amount entering tank 8 through the pipe 7, is taken out of said tank 8 by the overflow 12 and passes to the cooler 13$^a$. From this cooler, a certain amount of mother liquor circulates through the closed path 13$^a$ 16$^a$, 17$^a$, 18$^a$, 2$^a$, 2$^b$, 13$^a$, as above described. An amount of mother liquor substantially equal to the amount entering the cooler 13$^a$ through the overflow 12, is withdrawn through the overflow 19 into the cooler 13, and a certain amount of liquor circulates through the third closed path 13, 16, 17, 18, 2, 2$^c$, 13, as above described. In this manner the ammonium bifluoride liquor is circulated over the towers 2, 2$^a$ and 4 until it has absorbed as much hydrofluoric acid as is practicable, preferably until the mother liquor is substantially saturated with hydrofluoric acid; for instance until the total hydrofluoric acid content amounts to approximately from 55 to 60%. The heat of absorption in the three towers is sufficient, when the proper adjustments have been made, to prevent crystallization in the circulating liquor, but is not sufficient to cause any substantial loss of ammonia-content. Finally, an amount of liquor substantially equal to that entering the cooler 13 through the overflow 19, is withdrawn continuously through the overflow pipe 21 into the neutralizing and crystallizing tank 22. Here I add, through the pipe 27, the proper amount of ammonia, preferably in the anhydrous or gaseous state, to make ammonium bifluoride. The amount required for this purpose is determined by an analysis of the liquor in the neutralizing tank 22. After adding the proper amount of ammonia, I allow the liquor to cool and to crystallize (the cooling action being obtained by means of the coil 29), and separate the crystals of ammonium bifluoride in any suitable manner. The mother liquor is siphoned off through the pipe 23 into the tank 24, and this siphoning off may be sufficient for separating the crystals from the mother liquor. From the tank 24 the mother liquor passes to the storage tank 6 and from there again enters the circulation path in the manner described.

In this way, by having a sufficient number of neutralizing and crystallizing vessels such as 22 available, I obtain continuous absorption of the hydrofluoric acid generated in the stills. Since the mother liquor contains at all times a substantial amount of dissolved ammonium bifluoride, I avoid the nuisance and loss caused by the evolution of fumes when ammonia is introduced into the strong aqueous solution of hydrofluoric acid. The water which is lost in small amounts during the process is replaced when necessary by dilution of the liquor in the neutralizing tank.

At no time during the process is evaporation of the liquor and the consequent consumption of fuel necessary, since crystallization occurs on cooling the liquor after treating it with ammonia, and no substantial amount of ammonium bifluoride is lost, all mother liquors being returned to the process for the absorption of hydrofluoric acid gases. The elimination of evaporation reduces the amount of apparatus required, as well as the amount of supervision, and shortens the time required for producing a given quantity of product.

When it is desired to make neutral ammonium fluoride instead of ammonium bifluoride, this is accomplished by simply changing the proportions of ammonia and hydrofluoric acid, that is to say, a greater amount of ammonia will be added at the neutralizing tank, in the proportion required for the formation of neutral ammonium fluoride.

Various modifications may be made without departing from the nature of my invention as set forth in the appended claims. Thus, for example, while I have shown three towers for the successive absorption of hydrofluoric acid gas, their number might be varied, and even a single absorption step might be used in some cases and obviously there are many other variations in detail which could be employed in the practice of the invention without departure from the essentials thereof.

Thus, for continuous operations, a mechanical crystallizer of any well known or approved type may be substituted for the specific crystallizer which is illustrated in the drawing and any changes or modifications of such type or character are included within the scope of the invention and are intended to be covered by the claims.

I claim:

1. In the art of making an ammonium fluoride, that improvement which comprises exposing a gas containing hydrofluoric acid gas, to contact treatment with a liquor containing an ammonium fluoride, until such a solution of hydrofluoric acid in said liquor is obtained that, on subsequent addition of ammonia and cooling, an ammonium fluoride will crystallize from the mother liquor, treating the liquid product resulting from the said contact treatment between hydrofluoric acid gas and liquor, with ammonia to form an ammonium fluoride in the liquor, crystallizing out an ammonium fluoride, separating the said crystals from the mother liquor and using the mother liquor as the liquor of the first step.

2. In the art of making an ammonium fluoride, that improvement which comprises exposing a gas containing hydrofluoric acid gas, to counter-current contact treatment with a liquor containing an ammonium fluoride, until such a solution of hydrofluoric acid in said liquor is obtained that, on subsequent addition of ammonia and cooling, an ammonium fluoride will crystallize from the mother liquor, treating the liquid product resulting from the said counter-current contact treatment between hydrofluoric acid gas and liquor, with ammonia to form an ammonium fluoride in the liquor, cooling the liquid to crystallize out an ammonium fluoride, separating the said crystals from the mother liquor and using the mother liquor as the liquor of the first step.

3. In the art of making an ammonium fluoride, that improvement which comprises bringing mother liquor from the last step of the process into such counter-current contact with a gas stream containing hydrofluoric acid gas to abstract substantially the whole of the hydrofluoric acid gas from said gas stream, treating the resulting liquor with ammonia under temperature conditions favorable to the crystallization of an ammonium fluoride from said liquor, separating the resultant crystals from the mother liquor and withdrawing the mother liquor for use as mother liquor of the first step in a repetition of the cycle of operations.

4. In the art of making an ammonium fluoride, the improvement which comprises supplying continuously mother liquor from a batch of finished ammonium fluoride product, circulating such liquor in counter-current contact with hydrofluoric acid gas to produce a solution of hydrofluoric acid in such mother liquor, withdrawing from such circulation a portion of said solution corresponding substantially to the amount of mother liquor supplied continuously, treating the portion thus withdrawn with ammonia, crystallizing out the ammonium fluoride obtained, and separating the mother liquor from the crystals.

5. In the art of making an ammonium fluoride, the improvement which comprises supplying continuously mother liquor from a batch of finished ammonium fluoride product, circulating such liquor in contact with hydrofluoric acid gas to produce a solution of hydrofluoric acid in such mother liquor, withdrawing from such circulation a portion of said solution corresponding substantially to the amount of mother liquor supplied continuously, cooling such withdrawn portion and circulating it in absorptive contact with hydrofluoric acid gas to strengthen the said solution in hydrofluoric acid content, withdrawing from circulation a portion of the strengthened solution corresponding substantially to the amount of mother liquor supplied continuously, treating the portion thus withdrawn with ammonia, crystallizing out the ammonium fluoride obtained, and separating the mother liquor from the crystals.

6. In the art of making an ammonium fluoride, the improvement which comprises treating mother liquor from a batch of finished ammonium fluoride product with hydrofluoric acid to produce a solution of hydrofluoric acid in such mother liquor, treating the resulting liquid with ammonia, crystallizing out at atmospheric temperature the ammonium fluoride obtained, and separating the mother liquor from the crystals.

7. In the art of making an ammonium fluoride, the improvement which comprises absorbing substantially all of the hydrofluoric acid present in a gas with a fresh unsaturated solution of mother liquor before said gas is permitted to go to the waste stack, using the resulting mother liquor to treat the said hydrofluoric acid-bearing gas prior to the aforesaid operation, until the mother liquor is substantially saturated with respect to hydrofluoric acid, and withdrawing said saturated mother liquor for a crystallizing operation.

8. In the art of making an ammonium fluoride, the improvement which comprises continuously feeding a hydrofluoric acid gas into an absorption system at a point where the mother liquor is almost saturated with respect to hydrofluoric acid, continuously introducing fresh unsaturated mother liquor into the said system at a point where the treated gas has substantially all of its hydrofluoric gas removed therefrom, permitting said gas to escape into the atmosphere after substantially all of the hydrofluoric acid has been removed from said gas by said fresh unsaturated solution of mother liquor, and continuously withdrawing from the system mother liquor which is substantially saturated with respect to hydrofluoric acid.

9. In the art of making an ammonium fluoride, the improvement which comprises employing a counter-current absorption system of a plurality of stages in which a mother liquor of ammonium fluoride is used for absorbing hydrofluoric acid from a gas bearing said acid, the fresh unsaturated mother liquor being introduced into the system at a point immediately prior to the waste gas stack and the hydrofluoric acid bearing gas at a point adjacent to the outlet for mother liquor saturated with said acid.

In testimony whereof I have hereunto set my hand.

JAMES WILLIAM PROCTOR.